US010691137B2

(12) United States Patent
Kim

(10) Patent No.: US 10,691,137 B2
(45) Date of Patent: Jun. 23, 2020

(54) APPARATUS AND METHOD FOR CONTROLLING PLATOONING IN LEADING VEHICLE

(71) Applicants: Hyundai Motor Company, Seoul (KR); Kia Motors Corporation, Seoul (KR)

(72) Inventor: Sang Jun Kim, Gyeonggi-Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 42 days.

(21) Appl. No.: 16/019,124

(22) Filed: Jun. 26, 2018

(65) Prior Publication Data

US 2019/0179334 A1  Jun. 13, 2019

(30) Foreign Application Priority Data

Dec. 11, 2017 (KR) .................. 10-2017-0169198

(51) Int. Cl.
G05D 1/02 (2020.01)
G05D 1/00 (2006.01)
G08G 1/00 (2006.01)
B60W 30/16 (2020.01)

(52) U.S. Cl.
CPC .......... G05D 1/0289 (2013.01); B60W 30/16 (2013.01); G05D 1/0027 (2013.01); G05D 1/0055 (2013.01); G05D 1/0061 (2013.01); G05D 1/0295 (2013.01); G08G 1/22 (2013.01); G05D 2201/0213 (2013.01)

(58) Field of Classification Search
None
See application file for complete search history.

(56) References Cited

U.S. PATENT DOCUMENTS 9,632,507 B1* 4/2017 Korn ................. G05D 1/0293
2010/0256852 A1* 10/2010 Mudalige ............. G08G 1/163
701/24
2016/0320198 A1  11/2016 Liu et al.
2016/0358477 A1* 12/2016 Ansari ................. G08G 1/167
(Continued)

FOREIGN PATENT DOCUMENTS

JP      2002-266672 A    9/2002
KR      20120135611 A   12/2012
WO      2016134770 A1    9/2016

*Primary Examiner* — Thomas G Black
*Assistant Examiner* — Demetra R Smith-Stewart
(74) *Attorney, Agent, or Firm* — Mintz Levin Cohn Ferris Glovsky and Popeo, P.C.; Peter F. Corless

(57) ABSTRACT

An apparatus for controlling platooning in a leading vehicle can determine whether a collision between a leading vehicle and an object in front of the leading vehicle will occur based on data measured by one or more sensors; when the collision between the leading vehicle and an object in front of the leading vehicle is determined to occur, determine a possibility of a collision when a following vehicle brakes or a possibility that the following vehicle will change its lane; determine a command associated with a lane change of the following vehicle based on the determined possibility; transmit the command associated with the lane change of the following vehicle and an emergency braking command to the following vehicle via the communication circuit; and release the platooning.

20 Claims, 9 Drawing Sheets

(56) References Cited

U.S. PATENT DOCUMENTS

| | | |
|---|---|---|
| 2017/0011633 A1* | 1/2017 | Boegel ................. G05D 1/0293 |
| 2017/0061561 A1 | 3/2017 | Cha |
| 2017/0287233 A1* | 10/2017 | Nix ........................ G07C 5/008 |
| 2018/0032086 A1* | 2/2018 | Punithan ............... G05D 1/0016 |
| 2018/0037227 A1* | 2/2018 | D'sa ..................... B60W 30/16 |
| 2018/0050673 A1* | 2/2018 | D'sa ................. B60W 30/0953 |
| 2019/0147745 A1* | 5/2019 | Kim ....................... G08G 1/167 |
| | | 701/301 |

\* cited by examiner

APPARATUS AND METHOD FOR CONTROLLING PLATOONING IN LEADING VEHICLE

CROSS-REFERENCE TO RELATED APPLICATION

This application is based on and claims the benefit of priority to Korean Patent Application No. 10-2017-0169198, filed on Dec. 11, 2017 in the Korean Intellectual Property Office, the disclosure of which is incorporated herein in its entirety by reference.

TECHNICAL FIELD

The present disclosure relates to vehicular technologies and, more particularly, to an apparatus and method for providing a collision prevention strategy during platooning.

BACKGROUND

Platooning is technology of performing autonomous driving in a state where a plurality of vehicles are located at a specified interval in a row. A vehicle which is foremost in the platooning line ("leading vehicle") may control one or more vehicles which follow the leading vehicle ("following vehicles"). The leading vehicle may maintain an interval between the other vehicles in the platooning line and may exchange behavior and context information of the vehicles in the platooning line using vehicle-to-vehicle (V2V) communication.

When the leading vehicle detects an obstruction in front of its driving lane, a conventional platooning system shares information about the obstruction with the following vehicle and controls braking and steering to avoid collision with the obstruction. However, when the leading vehicle is unable to avoid the collision, the conventional platooning system may fail to provide a strategy for minimizing damage of the following vehicles. Particularly, the following vehicles may be exposed to a risk of a secondary collision after the collision of the leading vehicle because a forward view of the following vehicle is restricted during platooning.

SUMMARY

The present disclosure has been made to solve the above-mentioned problems occurring in the related art while advantages achieved by the related art are maintained intact.

An aspect of the present disclosure provides an apparatus and method for controlling platooning to provide various strategies to a leading vehicle and a following vehicle to cope with a dangerous situation when the leading vehicle is unable to avoid a collision.

The technical problems to be solved by the present inventive concept are not limited to the aforementioned problems, and any other technical problems not mentioned herein will be clearly understood from the following description by those skilled in the art to which the present disclosure pertains.

According to embodiments of the present disclosure, an apparatus for controlling platooning for a leading vehicle in a platooning group may include: one or more sensors configured to sense an object around the leading vehicle; a communication circuit configured to communicate with a following vehicle in the platooning group; a display configured to output a user interface associated with the platooning; and a processor electrically connected with the one or more sensors, the communication circuit, and the display. The processor can be configured to: determine whether a collision between the leading vehicle and an object in front of the leading vehicle will occur based on data measured by the one or more sensors; when the collision between the leading vehicle and the object in front of the leading vehicle is determined to occur, determine a possibility of a collision when the following vehicle brakes or a possibility that the following vehicle will change its lane; determine a command associated with a lane change of the following vehicle based on the determined possibility; transmit the command associated with the lane change of the following vehicle and an emergency braking command to the following vehicle via the communication circuit; and release the platooning.

The processor may be configured to calculate a forward clearance distance of the leading vehicle based on the data measured by the one or more sensors; determine a driving lane of the leading vehicle based on the forward clearance distance of the leading vehicle; and control a driving operation of the leading vehicle so as to travel in the determined driving lane.

The processor may be configured to, when a lane change of the leading vehicle is determined, control a driving operation of the following vehicle so as to travel in a lane different from the leading vehicle.

The processor may be configured to, when it is determined that the following vehicle will not collide with the object upon braking, transmit a lane keeping command and the emergency braking command to the following vehicle via the communication circuit, transmit a lane keeping command and the emergency braking command to the following vehicle via the communication circuit and release the platooning.

The one or more sensors may include a blind spot assist (BSA) sensor. The processor may be configured to determine the possibility that the following vehicle will change its lane based on information received from the following vehicle and information obtained by the BSA sensor.

The processor may be configured to, when it is determined that the following vehicle will collide with the object upon braking and that the following vehicle is unable to change its lane, transmit the emergency braking command to the following vehicle via the communication circuit.

The processor may be configured to, when it is determined that the following vehicle will collide with the object upon braking and that the following vehicle is unable to change its lane, control the following vehicle so as to hand a right to control a lateral direction of the following vehicle over to a driver of the following vehicle.

The processor may be configured to, when it is determined that the following vehicle will collide with the object upon braking and that the following vehicle is able to change its lane, transmit the command associated with the lane change and the emergency braking command to the following vehicle via the communication circuit and release the platooning.

The processor may be configured to transmit the command associated with the lane change to the following vehicle such that the following vehicle moves to a lane different from a driving lane of the leading vehicle.

The processor may be configured to transmit a command for the following vehicle to output information associated with a warning about the collision between the leading vehicle and the object in front of the leading vehicle, a warning about a collision of the following vehicle, lane keeping, the lane change, or a handover of a right to control the following vehicle via the communication circuit.

Furthermore, according to embodiments of the present disclosure, a method for controlling platooning for a leading vehicle in a platooning group may include: determining, by a processor, whether a collision between the leading vehicle and an object in front of the leading vehicle will occur based on data measured by one or more sensors electrically connected with the processor; when the collision between the leading vehicle and the object in front of the leading vehicle is determined to occur, determining, by the processor, a possibility of a collision when a following vehicle in the platooning group brakes or a possibility that the following vehicle will change its lane; determining, by the processor, a command associated with a lane change of the following vehicle based on the determined possibility; transmitting, by the processor, the command associated with the lane change of the following vehicle and an emergency braking command to the following vehicle; and releasing, by the processor, the platooning.

The method may further include: calculating, by the processor, a forward clearance distance of the leading vehicle based on the data measured by the one or more sensors; when the collision between the leading vehicle and the object is determined to occur, determining, by the processor, a driving lane of the leading vehicle based on the forward clearance distance of the leading vehicle; and controlling, by the processor, a driving operation of the leading vehicle so as to travel in the determined driving lane.

The method may further include: when a lane change of the leading vehicle is determined, controlling, by the processor, a driving operation of the following vehicle so as to travel in a lane different from the leading vehicle.

The transmitting may include, when it is determined that the following vehicle will not collide with the object upon braking o, transmitting, by the processor, a lane keeping command and the emergency braking command to the following vehicle.

The determining of the possibility that the following vehicle will change its lane may include determining, by the processor, the possibility that the following vehicle will change its lane based on information received from the following vehicle and information obtained by the leading vehicle.

The transmitting may include, when it is determined that the following vehicle will collide with the object upon braking and that the following vehicle is unable to change its lane, transmitting, by the processor, the emergency braking command to the following vehicle; and releasing, by the processor, the platooning.

The transmitting may include, when it is determined that the following vehicle will collide with the object upon braking and that the following vehicle is unable to change its lane, controlling, by the processor, the following vehicle so as to hand a right to control a lateral direction of the following vehicle to a driver of the following vehicle.

The transmitting may include, when it is determined that the following vehicle will collide with the object upon braking and that the following vehicle is able to change its lane, transmitting, by the processor, the command associated with the lane change and the emergency braking command to the following vehicle.

The transmitting may include transmitting, by the processor, the command associated with the lane change to the following vehicle such that the following vehicle moves to a lane different from a driving lane of the leading vehicle.

The method may further include transmitting, by the processor, a command for the following vehicle to output information associated with a warning about the collision between the leading vehicle and the object in front of the leading vehicle, a warning about a collision of the following vehicle, lane keeping, the lane change, or a handover of a right to control the following vehicle.

BRIEF DESCRIPTION OF THE DRAWINGS

The above and other objects, features and advantages of the present disclosure will be more apparent from the following detailed description taken in conjunction with the accompanying drawings.

Figure 1:
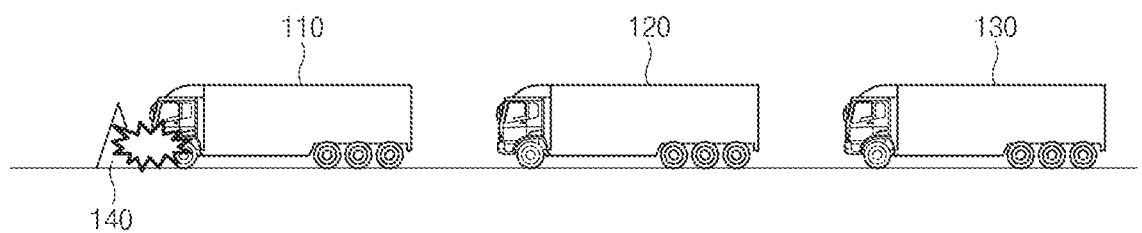
FIG. 1 is a drawing illustrating an environment where an apparatus for controlling platooning in a leading vehicle is operated, according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to the presently disclosed embodiments, FIG. 1 is a drawing illustrating an environment where an apparatus for controlling platooning in a leading vehicle is operated, according to embodiments of the present disclosure.

As shown in FIG. 1, a leading vehicle 110, a first following vehicle 120, and a second following vehicle 130 may perform platooning. The leading vehicle 110 may detect an obstruction 140 in front of the leading vehicle 110 during the platooning. The obstruction 140 may be an external vehicle. Although the leading vehicle 110 brakes or changes its lane, it may be in a situation where it is unable to avoid a collision with the obstruction 140 or another obstruction. The leading vehicle 110 may change its driving direction to a direction capable of minimizing damage based on a distance between the obstruction 140 or the obstruction and the leading vehicle 110 or the like concurrently with maximum braking. In this case, it may be difficult for the first following vehicle 120 to detect the obstruction 140 or the other obstruction because a view of the following vehicle 120 is restricted due to the leading vehicle 110. It may be difficult for the second following vehicle 130 to detect the obstruction 140 or the other obstruction because a view of the second following vehicle 130 is restricted due to the leading vehicle 110 and the first following vehicle 120. In this case, the first following vehicle 110 and the second following vehicle 130 may cause a secondary collision due to a collision of the leading vehicle 110. Further, if a platooning system loaded into the leading vehicle 110 is damaged due to the collision of the leading vehicle 110, the first following vehicle 110 and the second following vehicle 130 may face a more dangerous situation. When the collision of the leading vehicle 110 is determined, the leading vehicle 110 provide an avoidance strategy for the first following vehicle 120 and the second following vehicle 130 to the first following vehicle 120 and the second following vehicle 130. The leading vehicle 110 may provide an avoidance strategy suitable for the first following vehicle 120 and the second following vehicle 130 in overall consideration of a driving situation of the leading vehicle 110 and a driving situation of each of the first following vehicle 120 and the second following vehicle 130.

Figure 2:
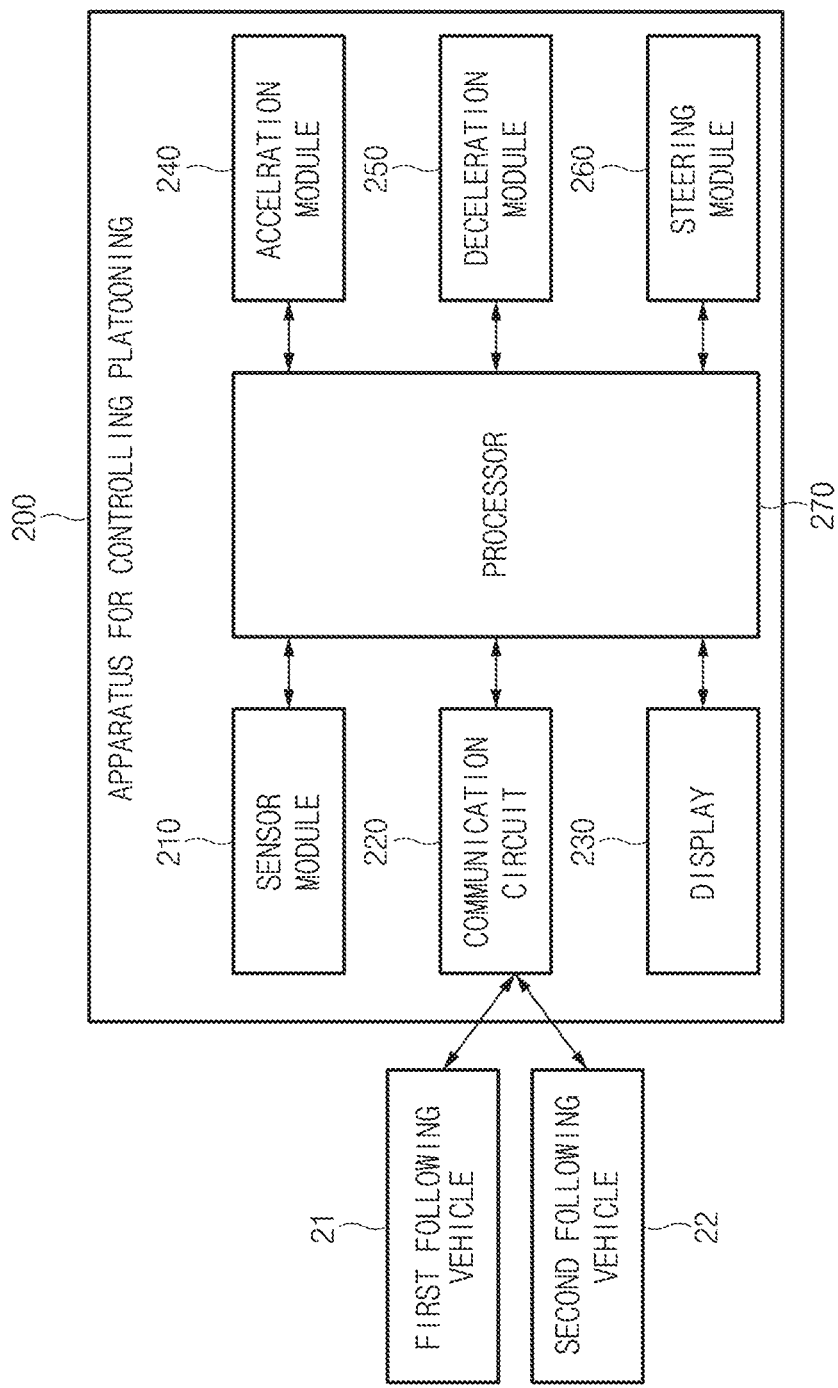
FIG. 2 is a block diagram illustrating a configuration of an apparatus for controlling platooning in a leading vehicle according to embodiments of the present disclosure.

FIG. 2 is a block diagram illustrating a configuration of an apparatus for controlling platooning in a leading vehicle according to embodiments of the present disclosure.

As shown in FIG. 2, an apparatus 200 for controlling platooning (hereinafter referred to as "apparatus 200" for convenience of description) according to embodiments of the present disclosure may include a sensor module 210, a communication circuit 220, a display 230, an acceleration device 240, a deceleration device 250, a steering device 260, and a processor 270. The apparatus 200 may be a system loaded into a leading vehicle included in a platooning group.

The sensor module 210 may be configured to sense an object around the leading vehicle. For example, the sensor module 210 may sense an obstruction or an external vehicle located in front of, beside, and/or behind the leading vehicle. The sensor module 210 may include, for example, a blind spot assist (BSA) sensor capable of sensing an obstruction or an external vehicle located beside or behind a driver of the leading vehicle. The sensor module 210 may sense a speed, acceleration, a steering angle, and the like of the leading vehicle.

The communication circuit 220 may be configured to communicate with the external vehicle. The communication circuit 220 may communicate with a following vehicle, for example, a first following vehicle 21 and a second following vehicle 22, included in the platooning group including the leading vehicle.

The display 230 may be configured to output a user interface associated with platooning. The display 230 may output an indication for providing a notification of, for example, a warning about a collision, lane keeping, a lane change, a handover of a control right, or the like.

The acceleration device 240 may be an engine capable of enhancing a speed of the leading vehicle. The deceleration device 250 may be a brake device capable of reducing a speed of the leading vehicle. The steering device 260 may be a steering capable of adjusting a steering angle of the leading vehicle.

The processor 270 may be electrically connected with the sensor module 210, the communication circuit 220, the display 230, the acceleration device 240, the deceleration device 250, and the steering device 260. The processor 270 may control the sensor module 210, the communication circuit 220, the display 230, the acceleration device 240, the deceleration device 250, and the steering device 260 and may perform a variety of data processing and various arithmetic operations.

The processor 270 may determine a collision between a leading vehicle and an object in front of the leading vehicle based on data measured by the sensor module 210. For example, the processor 270 may detect an object located in front of the leading vehicle using a forward sensor. When the leading vehicle is unable to avoid the object depending on braking and/or a lane change based on a distance between the object and the leading vehicle, a speed of the leading vehicle, and the like, the processor 270 may determine a collision between the leading vehicle and the object. The object may be located on, for example, a driving lane of the leading vehicle and/or another lane where the leading vehicle is able to move.

The processor 270 may determine a driving lane of the leading vehicle based on a forward clearance distance of the leading vehicle, calculated using the sensor module 210, and may control the leading vehicle to travel in the determined driving lane. The processor 270 may determine a lane capable of minimizing damage of the leading vehicle as a driving lane of the leading vehicle upon a collision of the leading vehicle and may control a steering device of the leading vehicle to move to the determined lane.

When a lane change of the leading vehicle is determined, the processor 270 may control a following vehicle to travel in a lane different from the leading vehicle. Since there is a high risk of a secondary collision when the following vehicle changes its lane to the same lane as the leading vehicle, the processor 270 may control the following vehicle to change the lane of the following vehicle to the lane different from the leading vehicle.

When a collision between the leading vehicle and the object in front of the leading vehicle is determined, the processor 270 may determine at least a portion of a possibility of a collision when the following vehicle brakes or a possibility that the following vehicle will change its lane. The processor 270 may determine a possibility of a collision with the leading vehicle or the object when the following vehicle brakes based on a speed of the following vehicle, a distance between the following vehicle and the leading vehicle or the object, a braking distance of the following vehicle, and/or the like. The processor 270 may determine a possibility that the following vehicle will change its change based on information received from the following vehicle (e.g., information obtained by a BSA sensor of the following vehicle) and information obtained by a BSA sensor of the leading vehicle. Since a view of the following vehicle is hidden by another vehicle in a platooning group, the processor 270 may determine a possibility that the following vehicle will change its change using both of information received from the following vehicle and information obtained by the BSA sensor of the leading vehicle.

The processor 270 may determine a command associated with a lane change of the following vehicle based on the determined result. The processor 270 may determine whether to maintain a driving lane of the following vehicle or change the driving lane of the following vehicle to another lane using the determined result.

The processor 270 may transmit the command associated with the lane change of the following vehicle and an emergency braking command to the following vehicle using the communication circuit 220. The processor 270 may transmit a lane change command or a lane keeping command to the following command and may simultaneously transmit an emergency braking command to the following vehicle.

For example, when it is determined that the following vehicle does not collide with the object upon braking of the following vehicle, the processor 270 may transmit a lane keeping command and an emergency braking command to the following vehicle using the communication circuit 220. Since a lane change in a dangerous situation has a high risk, the processor 270 may control the following vehicle to perform emergency braking in a lane where the following vehicle is traveling.

For another example, when it is determined that the following vehicle collides with the object upon braking of the following vehicle and that the following vehicle is unable to change its lane, the processor 270 may transmit an emergency braking command to the following vehicle using the communication circuit 220. In this case, the processor 270 may control the following vehicle to hand the right to control a lateral direction of the following vehicle over to a driver of the following vehicle such that the driver may find an optimum avoidance method for himself or herself.

As another example, when it is determined that the following vehicle collides with the object upon braking of the following vehicle and that the following vehicle is able to change its lane, the processor 270 may transmit a lane change command and an emergency braking command to the following vehicle using the communication circuit 220. When the following vehicle is able to avoid a collision by changing its lane, the processor 270 may control the following vehicle to perform a lane change and perform emergency braking. In this case, the processor 270 may transmit a lane change command to the following vehicle such that the following vehicle moves to a lane different from a driving lane of the leading vehicle to prevent a secondary collision.

The processor 270 may transmit a command for the following vehicle to output information associated with at least a portion of a warning about a collision of the leading vehicle, a warning about a collision of the following vehicle, lane keeping, a lane change, or a handover of a control right to the following vehicle using the communication circuit 220. The processor 270 may transmit information associated with a current situation to the following vehicle to notify a driver of the following vehicle of the current situation.

The processor 270 may release (i.e., discontinue) platooning. The processor 270 may provide an avoidance strategy to the following vehicle such that the following vehicle is not in a dangerous situation due to a damaged apparatus 200 after the apparatus 200 is damaged due to a collision of the leading vehicle and may release the platooning.

Figure 3:
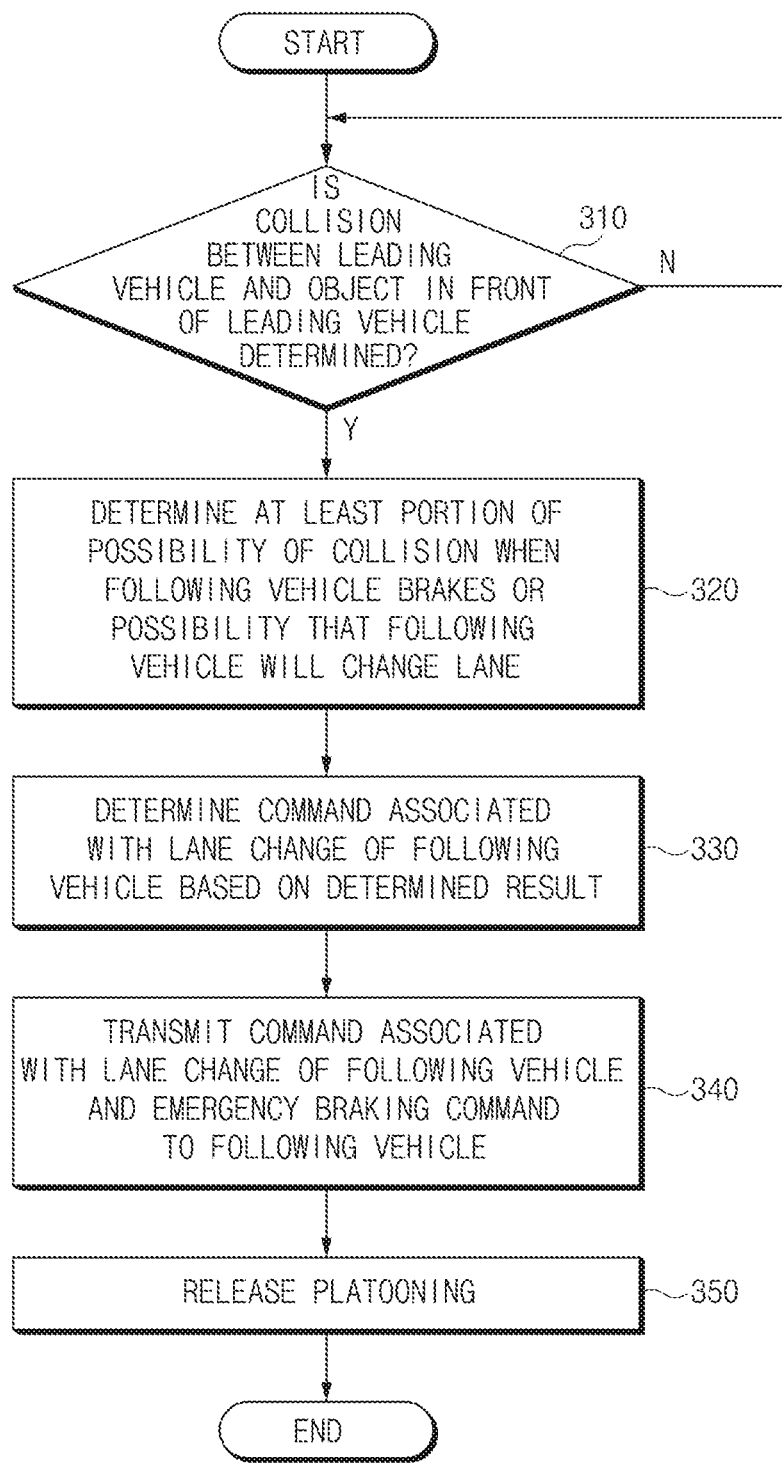
FIG. 3 is a flowchart illustrating a method for controlling platooning in a leading vehicle according to embodiments of the present disclosure.

FIG. 3 is a flowchart illustrating a method for controlling platooning in a leading vehicle according to embodiments of the present disclosure.

Hereinafter, it may be assumed that an apparatus 200 of FIG. 2 performs a process of FIG. 3. Further, in a description of FIG. 3, an operation described as being performed by an apparatus may be understood as being controlled by a processor 270 of the apparatus 200.

As shown in FIG. 3, in operation 310, the apparatus may determine whether a collision between a leading vehicle and an object in front of the leading vehicle is determined. For example, the apparatus may definitely predict the collision based on a distance between the leading vehicle and the object, a speed of the leading vehicle, a braking distance of the leading vehicle, and the like.

When the collision between the leading vehicle and the object is determined, in operation 320, the apparatus may determine at least a portion of a possibility of a collision when a following vehicle brakes or a possibility that the following vehicle will change its lane. For example, the apparatus may determine the possibility of the collision when the following vehicle brakes based on a distance between the following vehicle and the object or the leading vehicle, a speed of the following vehicle, a braking distance of the following vehicle, and the like and may determine the possibility that the following vehicle changes the lane based on information obtained by a BSA sensor of the following vehicle, a BSA sensor of the leading vehicle, and the like.

In operation 330, the apparatus may determine a command associated with a lane change of the following vehicle based on the determined result. For example, the apparatus may determine a lane keeping command, a lane change command, or a command such as a handover of a lateral control right.

In operation 340, the apparatus may transmit the command associated with the lane change of the following vehicle and an emergency braking command to the following vehicle. For example, the apparatus may transmit the command associated with the lane change determined in operation 330 and the emergency braking command as a collision avoidance strategy of the following vehicle to the following vehicle.

In operation 350, the apparatus may release platooning. Since the collision of the leading vehicle is determined, the apparatus may transmit an avoidance strategy to the following vehicle and may release the platooning.

Figure 4:
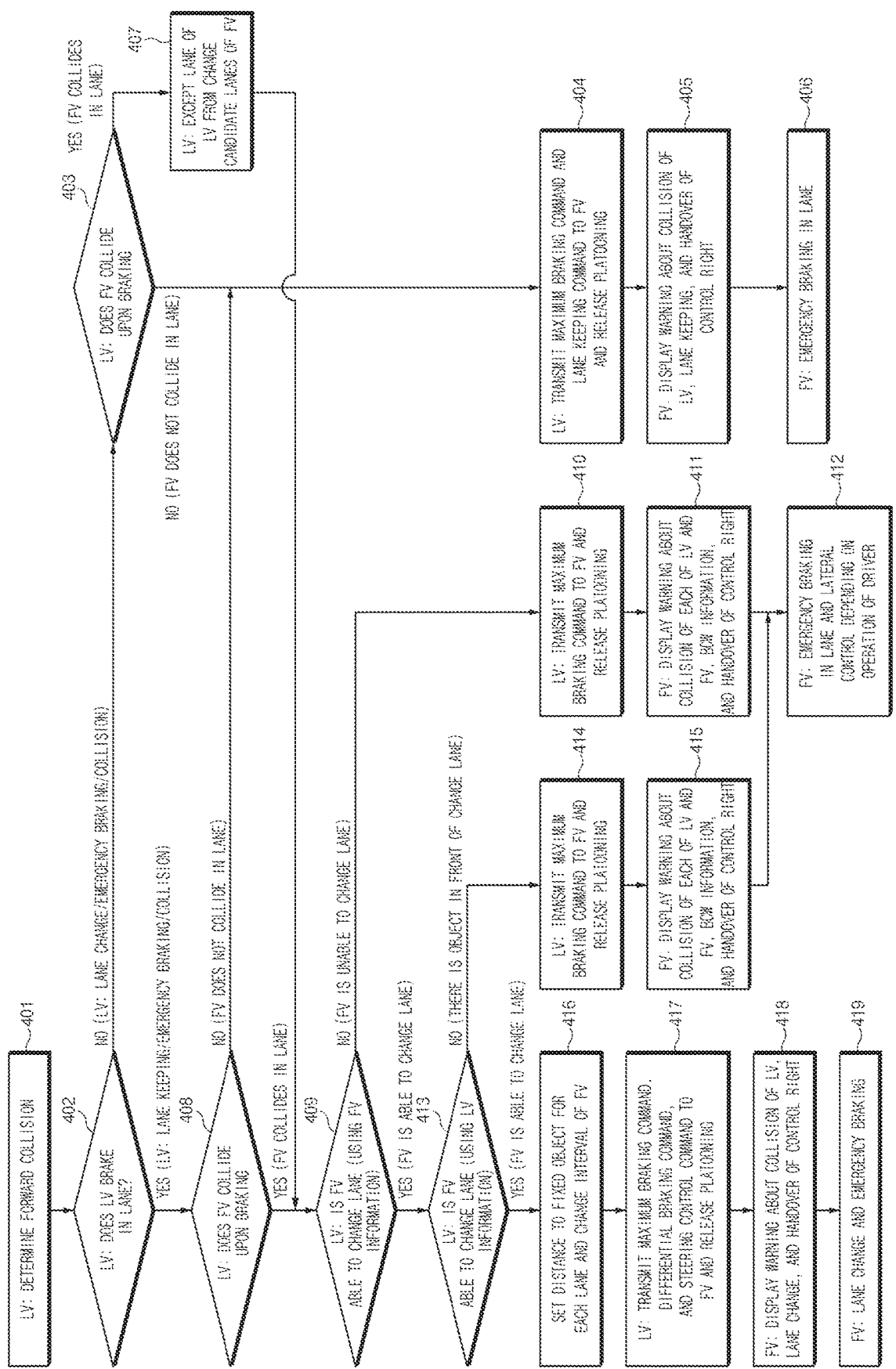
FIG. 4 is a flowchart illustrating a method for controlling platooning in a leading vehicle according to embodiments of the present disclosure.

FIG. 4 is a flowchart illustrating a method for controlling platooning in a leading vehicle according to embodiments of the present disclosure.

The method according to embodiments of the present disclosure may provide a control scheme of a leading vehicle and a following vehicle when a collision is determined in all situations such as lane keeping or a lane change during platooning. Since the following vehicle has a restricted forward view due to a forward vehicle during the platooning, it may be difficult for the following vehicle to optimally correspond to a forward situation. Thus, when the collision is determined, the leading vehicle may determine a current situation and may propose an optimum control strategy (e.g., emergency braking, lane keeping, a lane change, and/or a handover of a right to control lateral movement) for preventing a collision of the following vehicle to the following vehicle. The leading vehicle may transmit a control strategy to the following vehicle before the collision and may release the platooning.

The following vehicle may first perform emergency braking in a lane where it is traveling and may except a direction of the leading vehicle when it is necessary for changing a lane of the following vehicle for collision avoidance. Since the collision of the leading vehicle is determined, this is because there are many unclear elements due to the collision of the leading vehicle when the following vehicle heads towards the same direction as the leading vehicle.

When the collision of the leading vehicle is determined, the leading vehicle may select a direction capable of minimizing damage due to the collision based on a distance to a forward obstruction in its driving lane and a lane adjacent to the driving lane and a relative speed. After the leading vehicle selects its route, it may transmit a control command to the following vehicle based on information about an external object, obtained by a blind-spot collision warning (BCW) system of each of the leading vehicle and the following vehicle, a distance between the leading vehicle and the following vehicle, a distance to the external object when the following vehicle changes its lane, or the like and may simultaneously release platooning to prevent a collision of the following vehicle. Thus, the following vehicle may perform an initial response to be faster than a reaction of its driver such that the driver may cope with the collision through his or her own determination after the initial response. A description will be given in detail below of a detailed process with reference to FIG. 4.

Hereinafter, it may be assumed that a leading vehicle performs a process of FIG. 4. Further, in a description of FIG. 4, an operation described as being performed by the leading vehicle may be understood as being controlled by a processor 270 of the apparatus 200.

As shown in FIG. 4, in operation 401, a leading vehicle LV may determine a collision with an object in front of the leading vehicle LV.

In operation 402, the leading vehicle LV may determine whether to brake in a lane where it is traveling to minimize damage of the leading vehicle LV. When a lane change is determined, in operation 403, the leading vehicle LV may determine whether a following vehicle FV collides with the object when braking in a lane where it is traveling. When it is determined that the following FV does not collide with the object, in operation 404, the leading vehicle LV may transmit a maximum braking command and a lane keeping command to the following vehicle FV and may release platooning. In operation 405, the following vehicle FV may display an indication indicating a warning about the collision of the leading vehicle LV, lane keeping, and a handover of a control right. In operation 406, the following vehicle FV may perform emergency braking in the lane. When it is determined that the following vehicle FV collides with the object, in operation 407, the leading vehicle LV may except the traveling lane of the leading vehicle from change candidate lanes of the following vehicle FV.

When the lane keeping of the leading vehicle LV is determined, in operation 408, the leading vehicle LV may determine whether the following vehicle FV collides with the object when braking in a lane where it is traveling. When it is determined that the following vehicle does not collide with the object, the leading vehicle LV may perform operation 404 and the following vehicle FV may perform operations 405 and 406.

When it is determined that the following vehicle FV collides with the object, in operation 409, the leading vehicle LV may determine whether the following vehicle FV is able to change its lane based on information obtained by a BCW system of the following vehicle FV. When the following vehicle FV is unable to change the lane, in operation 410, the leading vehicle LV may transmit the maximum braking command to the following vehicle FV and may release the platooning. In operation 411, the following vehicle FV may display an indication indicating a warning about the collision of each of the leading vehicle LV and the following vehicle FV, BCW information, and a handover of a control right. In operation 412, the following vehicle FV may perform emergency braking in the lane and may be controlled in a lateral direction according to an operation of the driver.

When the following vehicle FV is able to change the lane, in operation 413, the leading vehicle LV may determine whether the following vehicle FV is able to change the lane based on information obtained by a BCW system of the leading vehicle LV (e.g., determine a possibility of a collision with the object hidden by the leading vehicle LV after the following vehicle changes the lane). When there is an object in front of the change lane, in operation 414, the leading vehicle LV may transmit the maximum braking command to the following vehicle FV and may release the platooning. In operation 415, the following vehicle FV may display an indication indicating a warning about the collision of the leading vehicle LV, BCW information, and a handover of a control right. The following vehicle FV may perform operation 412.

When the following vehicle is able to change the lane, in operation 416, the leading vehicle LV may set a distance to a fixed object for each lane and a change interval of the following vehicle FV to change a lane of the following vehicle FV. In operation 417, the leading vehicle LV may transmit the maximum braking command, a differential braking command, and a steering control command to the following vehicle FV and may release the platooning. In operation 418, the following vehicle FV may display an indication indicating a warning about the collision of the leading vehicle LV, a lane change, and a handover of a control right. In operation 419, the following vehicle FV may perform a lane change and may then perform emergency braking.

Figure 5:
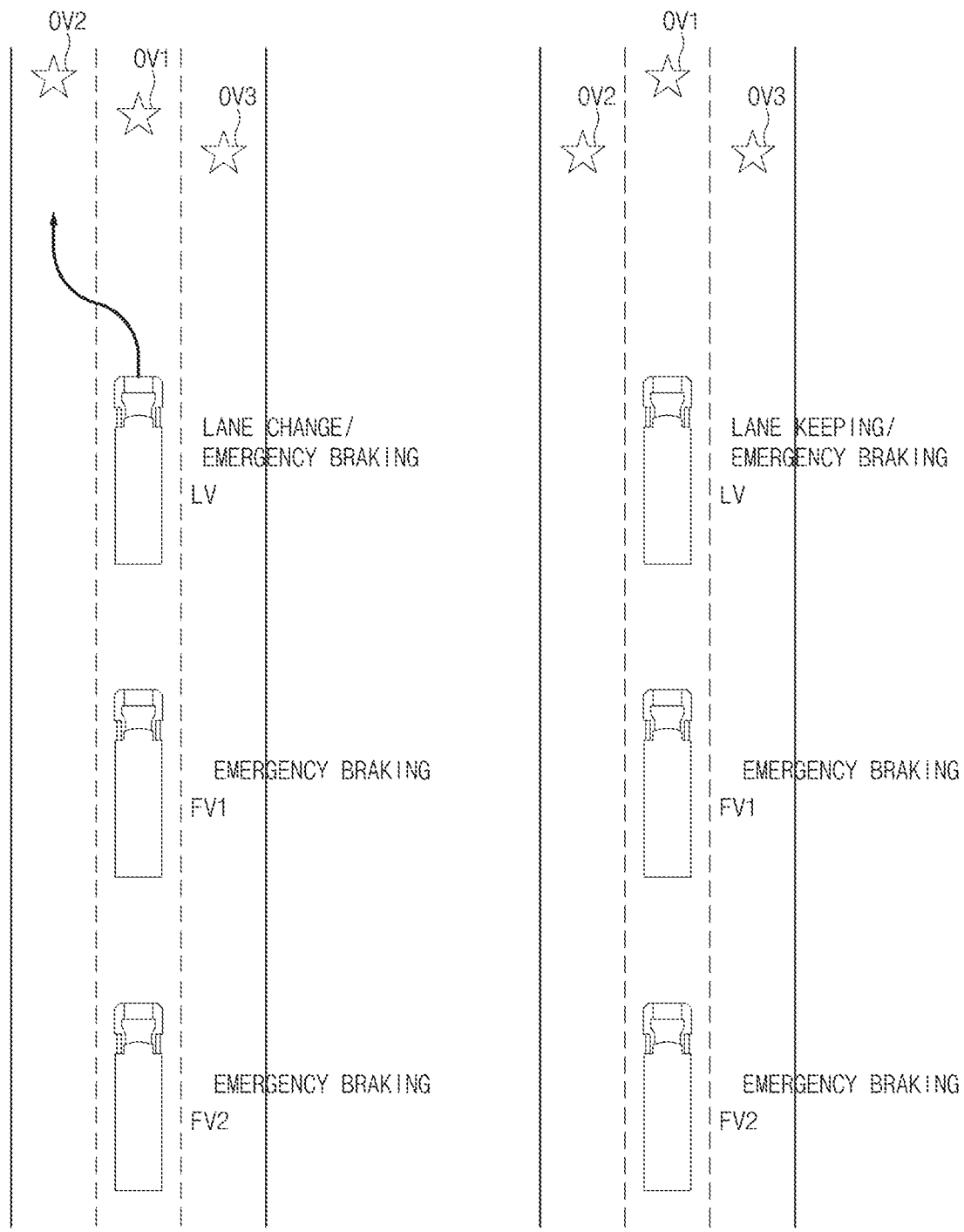
FIG. 5 is a drawing illustrating an exemplary behavior of a platooning group according to embodiments of the present disclosure.

FIG. 5 is a drawing illustrating an exemplary behavior of a platooning group according to embodiments of the present disclosure.

As shown in FIG. 5, a first obstruction OV1, a second obstruction OV2, and a third obstruction OV3 may be located in front of a leading vehicle LV of a platooning group.

The leading vehicle LV may collide with the first obstruction OV1, the second obstruction OV2, or the third obstruction OV3. When the leading vehicle LV is unable to avoid its collision, it may change its driving lane to the most distant left lane from an obstruction and may perform emergency braking to minimize its damage. When each of a first following vehicle FV1 and a second following vehicle FV2 is able to avoid its collision upon its braking, the leading vehicle LV may transmit a maximum braking command a lane keeping command to the first following vehicle FV1 and the second following vehicle FV2. Each of the first following vehicle FV1 and the second following vehicle FV2 may perform emergency braking in its lane. The leading vehicle LV may release platooning before the collision and may collide with the second obstruction OV2.

When the leading vehicle LV is unable to avoid its collision, it may perform emergency braking in the most distant current lane from an obstruction to minimize its damage. When each of the first following vehicle FV1 and the second following vehicle FV2 is able to avoid its collision upon its braking, the leading vehicle LV may transmit the maximum braking command and the lane keeping command to the first following vehicle FV1 and the second following vehicle FV2. Each of the first following vehicle FV1 and the second following vehicle FV2 may perform emergency braking in its lane. The leading vehicle LV may release platooning before the collision and may collide with the first obstruction OV1.

Figure 6:
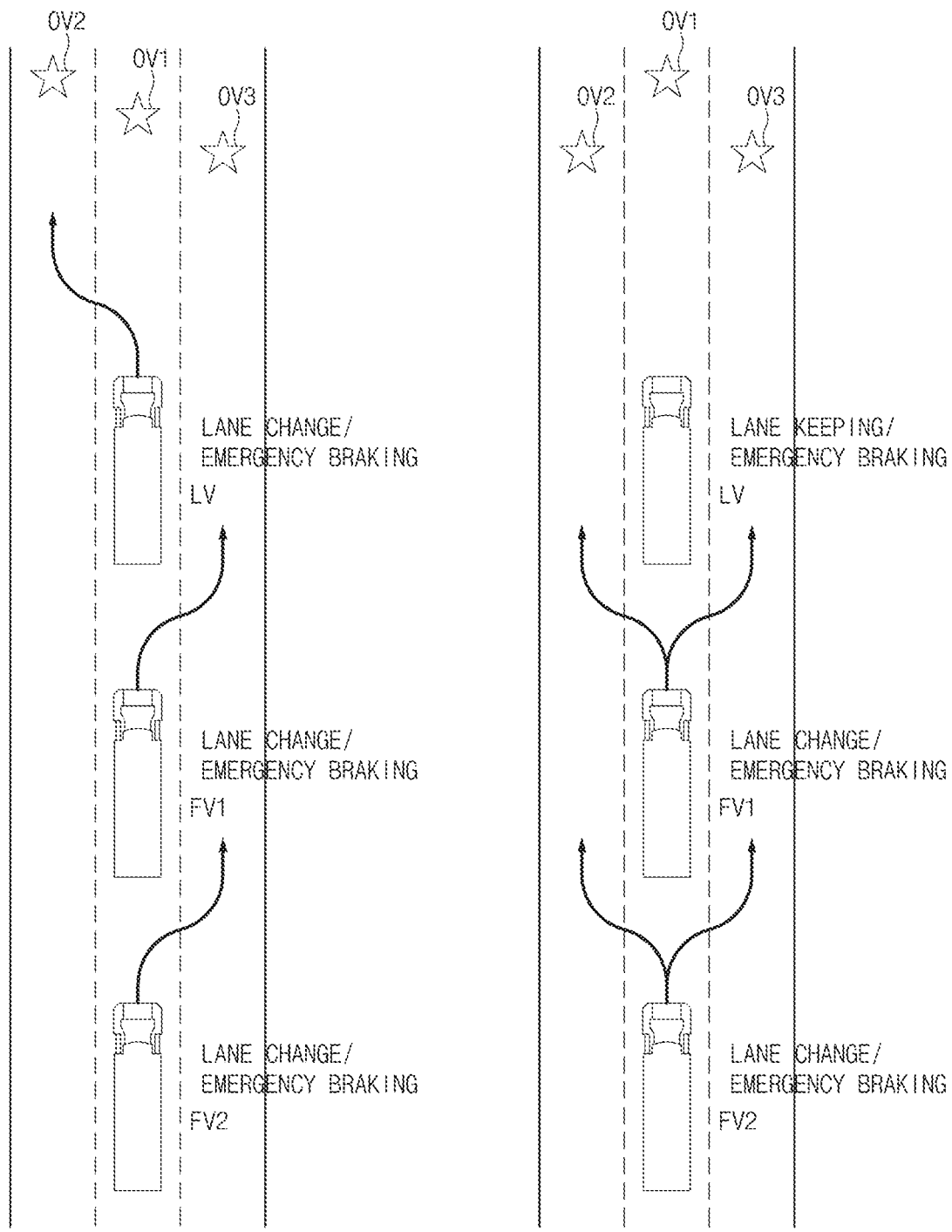
FIG. 6 is a drawing illustrating an exemplary behavior of a platooning group according to embodiments of the present disclosure.

FIG. 6 is a drawing illustrating an exemplary behavior of a platooning group according to embodiments of the present disclosure.

As shown in FIG. 6, a first obstruction OV1, a second obstruction OV2, and a third obstruction OV3 may be located in front of a leading vehicle LV of a platooning group.

The leading vehicle LV may collide with the first obstruction OV1, the second obstruction OV2, or the third obstruction OV3. When the leading vehicle LV is unable to avoid its collision, it may change its driving lane to the most distant left lane from an obstruction and may perform emergency braking to minimize its damage. When each of a first following vehicle FV1 and a second following vehicle FV2 is unable to avoid its collision upon its braking and is able to avoid the collision upon its lane change, the leading vehicle LV may transmit a maximum braking command and a lane change command to the first following vehicle FV1 and the second following vehicle FV2. Each of the first following vehicle FV1 and the second following vehicle FV2 may change its lane to a lane different from the leading vehicle LV and may perform emergency braking. The leading vehicle LV may release platooning before the collision and may collide with the second obstruction OV2.

When the leading vehicle LV is unable to avoid its collision, it may perform emergency braking in the most distant current lane from an obstruction to minimize its damage. When each of the first following vehicle FV1 and the second following vehicle FV2 is unable to avoid its collision upon its braking and is able to avoid the collision upon its lane change, the leading vehicle LV may transmit the maximum braking command and the lane change command to the first following vehicle FV1 and the second following vehicle FV2. Each of the first following vehicle FV1 and the second following vehicle FV2 may change its lane to a movable lane and may perform emergency braking. The leading vehicle LV may release platooning before the collision and may collide with the first obstruction OV1.

Figure 7:
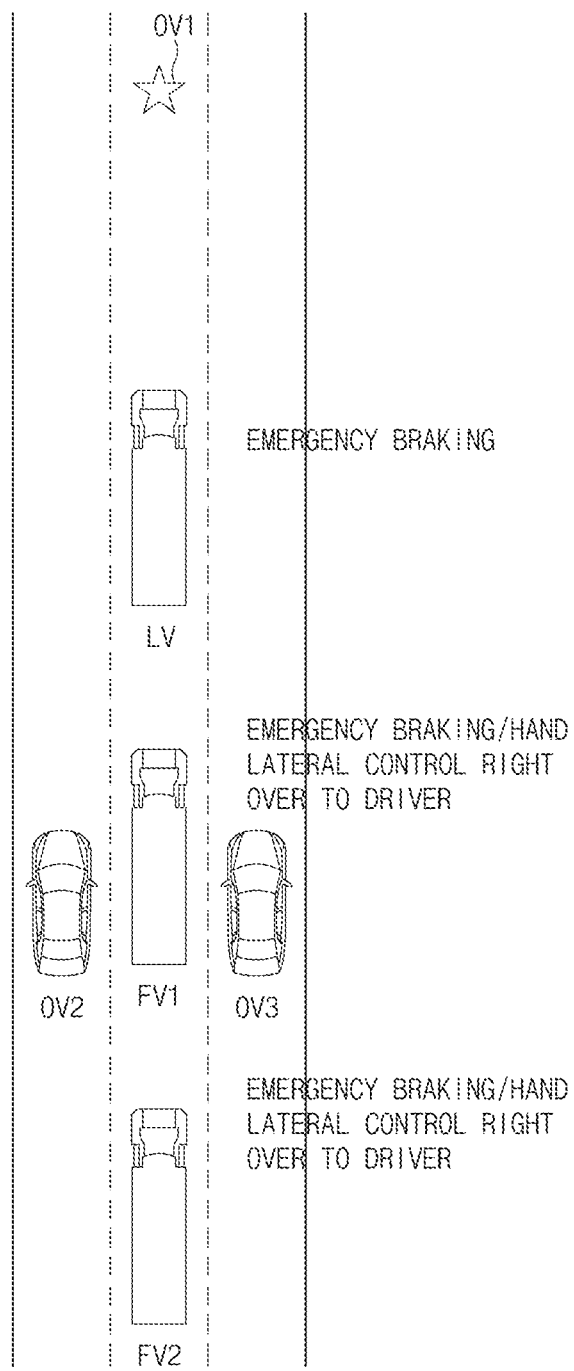
FIG. 7 is a drawing illustrating an exemplary behavior of a platooning group according to an embodiment of the present disclosure.

FIG. 7 is a drawing illustrating an exemplary behavior of a platooning group according to embodiments of the present disclosure.

As shown in FIG. 7, a first obstruction OV1 may be located in front of a leading vehicle LV of a platooning group. A second obstruction OV2 and a third obstruction OV3 may be located beside a first following vehicle FV1 of the platooning group.

The leading vehicle LV may collide with the first obstruction OV1, the second obstruction OV2, or the third obstruction OV3. When the leading vehicle LV is unable to avoid its collision, it may perform emergency braking in a current lane to minimize its damage. When the first following vehicle FV is unable to avoid its collide upon its braking and lane change, the leading vehicle LV may transmit a maximum braking command to the first following vehicle FV1 and may hand the right to control a lateral direction of the first following vehicle FV1 over to a driver of the first following vehicle FV1. When it is determined that a second following vehicle FV2 is able to change its lane, but collides with the second obstruction OV2 or the third obstruction OV3 after the lane change, the leading vehicle LV may transmit a maximum braking command to the second following vehicle FV2 and may hand the right to control a lateral direction of the second following vehicle FV2 over to a driver of the second following vehicle FV2. Each of the first following vehicle FV1 and the second following vehicle FV2 may perform emergency braking and may move in a lateral direction depending on an operation of the driver. The leading vehicle LV may release platooning before the collision and may collide with the first obstruction OV1.

Figure 8:
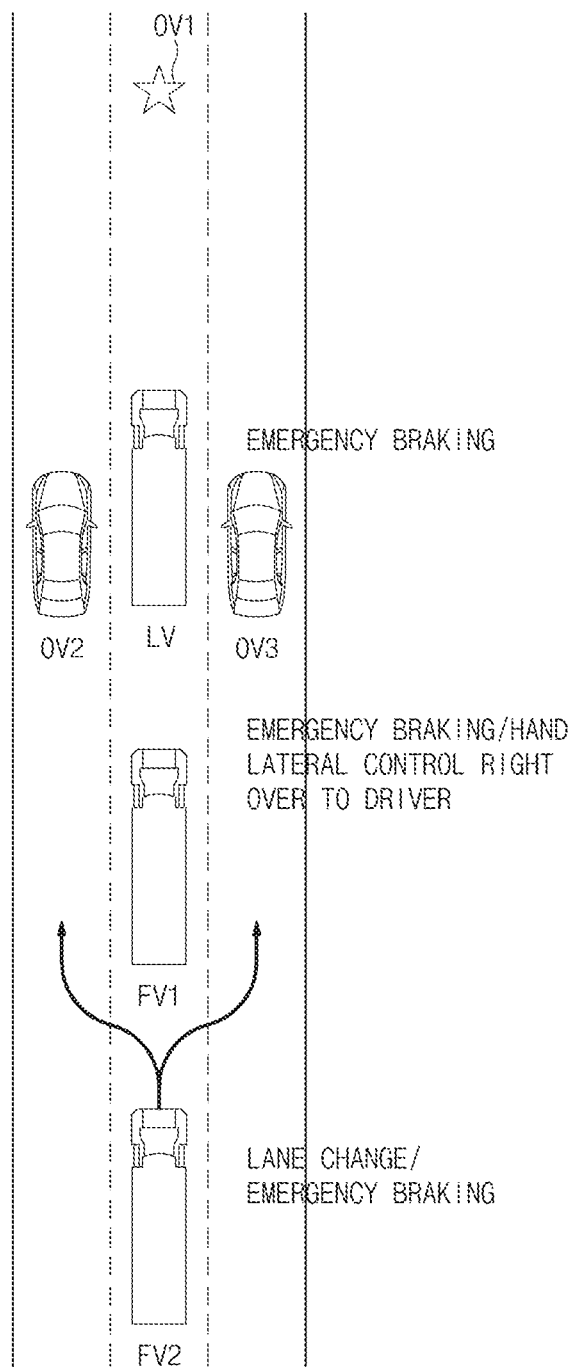
FIG. 8 is a drawing illustrating an exemplary behavior of a platooning group according to embodiments of the present disclosure.

FIG. 8 is a drawing illustrating an exemplary behavior of a platooning group according to embodiments of the present disclosure.

A leading vehicle LV may collide with a first obstruction OV1, a second obstruction OV2, or a third obstruction OV3. When the leading vehicle LV is unable to avoid its collision, it may perform emergency braking in a current lane to minimize its damage. When it is determined that a first following vehicle FV1 is unable to avoid its collision upon its braking and that the first following vehicle FV1 is able to change its lane, but collides with the second obstruction OV2 or the third obstruction OV3 after the lane change, the leading vehicle LV may transmit a maximum braking command to the first following vehicle FV1 and may hand the right to control a lateral direction of the first following vehicle FV1 over to a driver of the first following vehicle FV1. The first following vehicle FV1 may perform emergency braking and may move in a lateral direction depending on an operation of the driver. When a second following vehicle FV2 is unable to avoid its collision upon its braking and is able to avoid the collision upon its lane change, the leading vehicle LV may transmit a maximum braking command and a lane change command to the second following vehicle FV2. The second following vehicle FV2 may change its lane to a movable lane and may perform emergency braking. The leading vehicle LV may release platooning before the collision and may collide with the first obstruction OV1.

Figure 9:
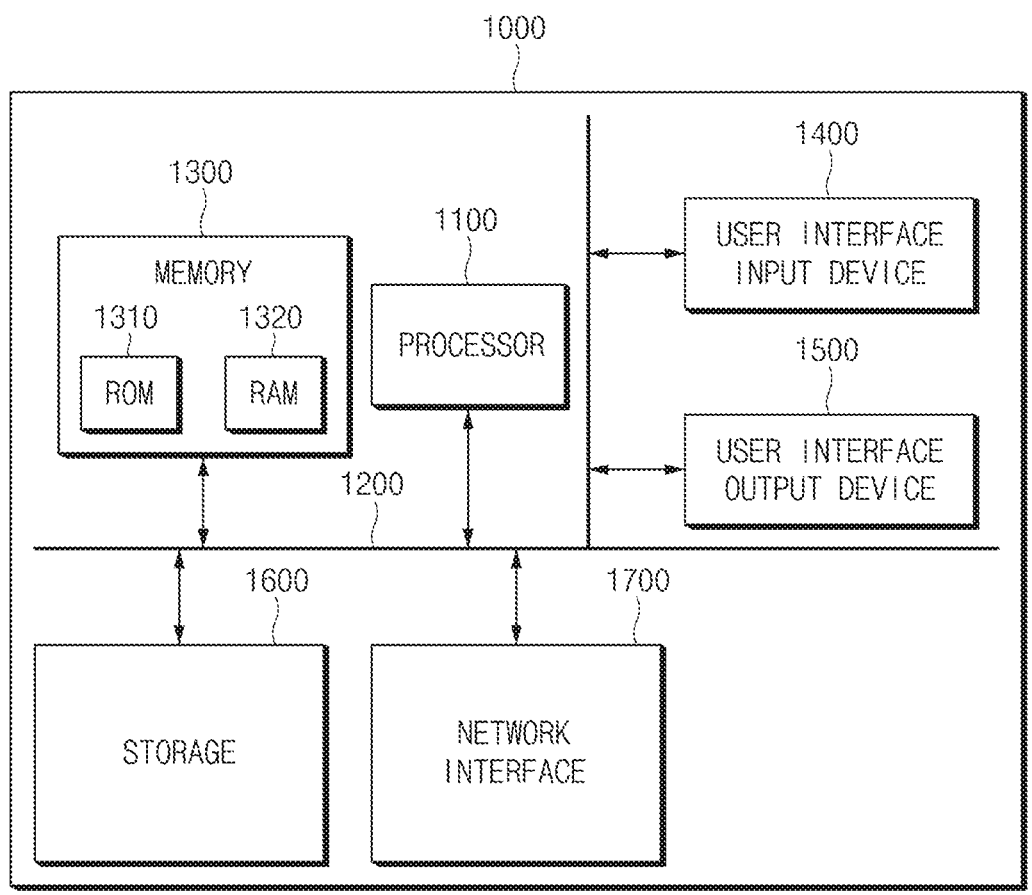
FIG. 9 is a block diagram illustrating a configuration of a computing system according to embodiments of the present disclosure.

FIG. 9 is a block diagram illustrating a configuration of a computing system according to embodiments of the present disclosure.

As shown in FIG. 9, the above-mentioned method according to embodiments of the present disclosure may be implemented through the computing system. A computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for executing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application-specific integrated circuit (ASIC). The ASIC may reside in a user terminal. Alternatively, the processor and storage medium may reside as a separate component of the user terminal.

The apparatus for controlling platooning in the leading vehicle according to embodiments of the present disclosure may control a following vehicle to fit a situation of the following vehicle in overall consideration of the situation of the following vehicle when a collision of the leading vehicle is determined, such that the following vehicle safely copes with a secondary dangerous situation capable of occurring upon the collision of the leading vehicle.

In addition, various effects indirectly or directly ascertained through the present disclosure may be provided.

While the present disclosure has been described with reference to certain embodiments, it will be apparent to those skilled in the art that various changes and modifications may be made without departing from the spirit and scope of the present disclosure.

Therefore, embodiments of the present disclosure described herein are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. An apparatus for controlling platooning for a leading vehicle in a platooning group, the apparatus comprising:
   one or more sensors configured to sense an object around the leading vehicle;
   a communication circuit configured to communicate with a following vehicle in the platooning group;
   a display configured to output a user interface associated with the platooning; and
   a processor electrically connected with the one or more sensors, the communication circuit, and the display,
   wherein the processor is configured to:
   determine whether a collision between the leading vehicle and at least one of a plurality of objects in front of the leading vehicle will occur based on data measured by the one or more sensors;
   when the collision between the leading vehicle and the at least one of the plurality of objects in front of the leading vehicle is determined to occur, determine a possibility of a collision when the following vehicle brakes or a possibility that the following vehicle will change its lane;
   determine a command associated with a lane change of the following vehicle, change lane of the leading vehicle to a lane in which an object having the least possibility of collision exists among the plurality of objects or perform emergency braking of the leading vehicle based on the determined possibility;
   transmit the command associated with the lane change of the following vehicle and an emergency braking command to the following vehicle via the communication circuit; and
   release the platooning, while the driving lanes of the leading vehicle and the following vehicle are different.

2. The apparatus of claim 1, wherein the processor is further configured to:
   calculate a forward clearance distance of the leading vehicle based on the data measured by the one or more sensors;
   determine a driving lane of the leading vehicle based on the forward clearance distance of the leading vehicle; and
   control a driving operation of the leading vehicle so as to travel in the determined driving lane.

3. The apparatus of claim 2, wherein the processor is further configured to:
when a lane change of the leading vehicle is determined, control a driving operation of the following vehicle so as to travel in a lane different from the leading vehicle.

4. The apparatus of claim 1, wherein the processor is further configured to:
when it is determined that the following vehicle will not collide with the at least one object upon braking, transmit a lane keeping command and the emergency braking command to the following vehicle via the communication circuit; and
release the platooning.

5. The apparatus of claim 1, wherein the one or more sensors comprise a blind spot assist (BSA) sensor, and wherein the processor is further configured to:
determine the possibility that the following vehicle will change its lane based on information received from the following vehicle and information obtained by the BSA sensor.

6. The apparatus of claim 1, wherein the processor is further configured to:
when it is determined that the following vehicle will collide with the at least one object upon braking and that the following vehicle is unable to change its lane, transmit the emergency braking command to the following vehicle via the communication circuit; and
release the platooning.

7. The apparatus of claim 6, wherein the processor is further configured to:
when it is determined that the following vehicle will collide with the at least one object upon braking and that the following vehicle is unable to change its lane, control the following vehicle so as to hand a right to control a lateral direction of the following vehicle over to a driver of the following vehicle.

8. The apparatus of claim 1, wherein the processor is further configured to:
when it is determined that the following vehicle will collide with the at least one object upon braking and that the following vehicle is able to change its lane, transmit the command associated with the lane change and the emergency braking command to the following vehicle via the communication circuit; and
release the platooning.

9. The apparatus of claim 8, wherein the processor is further configured to:
transmit the command associated with the lane change to the following vehicle such that the following vehicle moves to a lane different from a driving lane of the leading vehicle.

10. The apparatus of claim 1, wherein the processor is configured to:
transmit a command for the following vehicle to output information associated with a warning about the collision between the leading vehicle and the at least one object in front of the leading vehicle, a warning about a collision of the following vehicle, lane keeping, the lane change, or a handover of a right to control the following vehicle via the communication circuit.

11. A method for controlling platooning for a leading vehicle in a platooning group, the method comprising:
determining, by a processor, whether a collision between the leading vehicle and at least one of a plurality of objects in front of the leading vehicle will occur based on data measured by one or more sensors electrically connected with the processor;
when the collision between the leading vehicle and the at least one of a plurality of objects in front of the leading vehicle is determined to occur, determining, by the processor, a possibility of a collision when a following vehicle in the platooning group brakes or a possibility that the following vehicle will change its lane;
determining, by the processor, a command associated with a lane change of the following vehicle based on the determined possibility, changing lane of the leading vehicle to a lane in which an object having the least possibility of collision exists among the plurality of objects or performing emergency braking of the leading vehicle;
transmitting, by the processor, the command associated with the lane change of the following vehicle and an emergency braking command to the following vehicle; and
releasing, by the processor, the platooning, while the driving lanes of the leading vehicle and the following vehicle are different.

12. The method of claim 11, further comprising:
calculating, by the processor, a forward clearance distance of the leading vehicle based on the data measured by the one or more sensors; when the collision between the leading vehicle and the at least one object is determined to occur, determining, by the processor, a driving lane of the leading vehicle based on the forward clearance distance of the leading vehicle; and controlling, by the processor, a driving operation of the leading vehicle so as to travel in the determined driving lane.

13. The method of claim 12, further comprising:
when a lane change of the leading vehicle is determined, controlling, by the processor, a driving operation of the following vehicle so as to travel in a lane different from the leading vehicle.

14. The method of claim 11, wherein the transmitting comprises:
when it is determined that the following vehicle will not collide with the at least one object upon braking, transmitting, by the processor, a lane keeping command and the emergency braking command to the following vehicle.

15. The method of claim 11, wherein the determining of the possibility that the following vehicle will change its lane comprises:
determining, by the processor, the possibility that the following vehicle will change its lane based on information received from the following vehicle and information obtained by the leading vehicle.

16. The method of claim 11, wherein the transmitting comprises:
when it is determined that the following vehicle will collide with the at least one object upon braking and that the following vehicle is unable to change its lane, transmitting, by the processor, the emergency braking command to the following vehicle; and
releasing, by the processor, the platooning.

17. The method of claim 16, wherein the transmitting further comprises:
when it is determined that the following vehicle will collide with the at least one object upon braking and that the following vehicle is unable to change its lane, controlling, by the processor, the following vehicle so as to hand a right to control a lateral direction of the following vehicle to a driver of the following vehicle.

18. The method of claim 11, wherein the transmitting comprises:

when it is determined that the following vehicle will collide with the at least one object upon braking and that the following vehicle is able to change its lane, transmitting, by the processor, the command associated with the lane change and the emergency braking command to the following vehicle.

19. The method of claim 18, wherein the transmitting further comprises:
transmitting, by the processor, the command associated with the lane change to the following vehicle such that the following vehicle moves to a lane different from a driving lane of the leading vehicle.

20. The method of claim 11, further comprising:
transmitting, by the processor, a command for the following vehicle to output information associated with a warning about the collision between the leading vehicle and the at least one object in front of the leading vehicle, a warning about a collision of the following vehicle, lane keeping, the lane change, or a handover of a right to control the following vehicle.

* * * * *